United States Patent [19]

Fujii et al.

[11] 4,321,009
[45] Mar. 23, 1982

[54] RUNNER LINER OF FLUID MACHINE AND METHOD OF FIXING THE SAME

[75] Inventors: Tsuyoshi Fujii, Hitachi; Isao Yanagida, Juomachi, both of Japan

[73] Assignee: Hitachi, Ltd., Tokyo, Japan

[21] Appl. No.: 958,389

[22] Filed: Nov. 7, 1978

[30] Foreign Application Priority Data

Nov. 9, 1977 [JP] Japan .................. 52-133431

[51] Int. Cl.³ .................. F03B 3/10; F01D 11/08
[52] U.S. Cl. .................. 415/172 R; 415/174; 415/196; 415/201
[58] Field of Search ............ 415/172, 174, 170, 196, 415/201; 416/186 R

[56] References Cited

U.S. PATENT DOCUMENTS

| | | | |
|---|---|---|---|
| 2,784,936 | 3/1957 | Schmidt | 416/186 R |
| 3,180,613 | 4/1965 | Sproule | 415/172 |
| 3,578,874 | 5/1971 | Sproule et al. | 415/201 X |
| 4,012,170 | 3/1977 | Grubb | 415/172 |

FOREIGN PATENT DOCUMENTS

| | | | |
|---|---|---|---|
| 112932 | 4/1929 | Austria | 416/186 R |
| 1141144 | 8/1957 | France | 415/201 |
| 1261800 | 4/1961 | France | 416/186 R |

*Primary Examiner*—Everette A. Powell, Jr.
*Attorney, Agent, or Firm*—Thomas E. Beall, Jr.

[57] ABSTRACT

A runner liner of fluid machine which can be attached and detached to and from the runner of the fluid machine without necessitating the disassembling of the latter. The runner liner can be fitted to a groove which is formed in the periphery of the runner, and is divided into a plurality of segments each of which being so sized that it can be brought into the runner chamber through anyone of the fluid passages coming into and out of the runner chamber. The attaching of the runner liner to the periphery of the runner is made by making use of pockets formed in the head cover and the bottom cover which in combination define the runner chamber.

8 Claims, 11 Drawing Figures

RUNNER LINER OF FLUID MACHINE AND METHOD OF FIXING THE SAME

BACKGROUND OF THE INVENTION

1. Field of the Invention

The present invention relates to a runner liner of fluid machine such as water turbine, pump turbine, pump and the like. More particularly, the invention is concerned with a construction of the runner liner which is attached to the periphery of the runner of a fluid machine so as to constitute a seal in combination with a stationary part of a runner chamber accommodating the runner.

2. Description of the Prior Art

Fluid machines are machines for extracting energy from fluids or, alternatively, delivering energy to the fluid. Water turbines and pumps are typical examples of the former and latter type fluid machines. In addition, there is a fluid machine called pump turbine, which can perform both of above-mentioned two functions. Although the present invention is applicable to all kinds of fluid machines as mentioned above, an explanation will be made hereinafter specifically in connection with a water turbine or pump turbine, by way of example, in order to clarify and simplify the explanation of the invention.

In general, a water tubine has a runner, a runner chamber accommodating the runner and a main shaft attached to the runner. In operation, water of a large head is introduced into the runner chamber and acts on the runner to rotate the same. The rotation of the runner is transmitted, through the main shaft, to a generator adapted to produce electric energy. After delivering the energy to the runner, the water is discharged out of the runner chamber.

In case of a pump turbine, a pumping operation can be performed in the reverse manner. Namely, the runner is driven by externally supplied electric energy, so as to suck water of low pressure into the runner chamber, and to pressurize the water. The pressurized water is discharged out of the runner chamber at a high pressure. Thus during the pumping operation of the pump turbine, the direction of flow of water is reverse to that in ordinary water turbine.

Since the runner is rotated while the wall of the runner chamber is fixed, a suitable gap has to be preserved therebetween. In operation, the water of high pressure is liable to leak through this gap, resulting in a reduction of efficiency of the water turbine and pump turbine.

To avoid this, the gap between the periphery of the runner and the wall of the runner chamber is set extremely narrow, so as to prevent the water of large head to leak therethrough.

The peripheral portion of the water turbine or pump turbine is, however, inconveniently eroded by the water of high pressure and ground upon contact with the opposing wall surface of the runner chamber, as it works for a long period of time.

Consequently, the gap between the peripheral portion of the runner and the wall of the runner chamber grows large to increase the rate of leakage of the high pressure water.

It is therefore necessary to regenerate the eroded and ground peripheral surface of the runner. The work for the regeneration is, however, extremely expensive and time consuming, for the following reasons.

Firstly, in order to extract the runner from the runner chamber, it is necessary to demount parts such as head cover, main shaft, main shaft bearing, and the generator.

Secondly, the regeneration itself is a troublesome work which consists in cutting and removing the defective parts in the peripheral surface of the runner, making a build-up welding and then finishing the built-up surface at a required precision.

In order to simplify and facilitate the regeneration work, it has been proposed to use a liner (referred to as runner liner in this specification) attached to the periphery of the runner. According to this proposed method, the eroded and ground peripheral surface can be regenerated simply by renewing the liner. The liner conventionally used is, however, an integral ring-shaped liner adapted to be fit around the runner. It is therefore necessary, in order to renew the liner, to extract the runner from the runner chamber. Thus, this solution is still unsatisfactory, because of the previously mentioned first reason.

SUMMARY OF THE INVENTION

It is therefore a major object of the invention to provide a runner liner which can be attached and detached to and from the runner, without necessitating the extraction of the latter from the runner chamber.

To this end, according to the invention, the runner liner is divided into a plurality of segments of a suitable size.

The above and other objects, as well as advantageous features of the invention will become more clear from the following description of the preferred embodiments taken in conjunction with the accompanying drawings.

DESCRIPTION OF THE PREFERRED EMBODIMENTS

Figure 1:
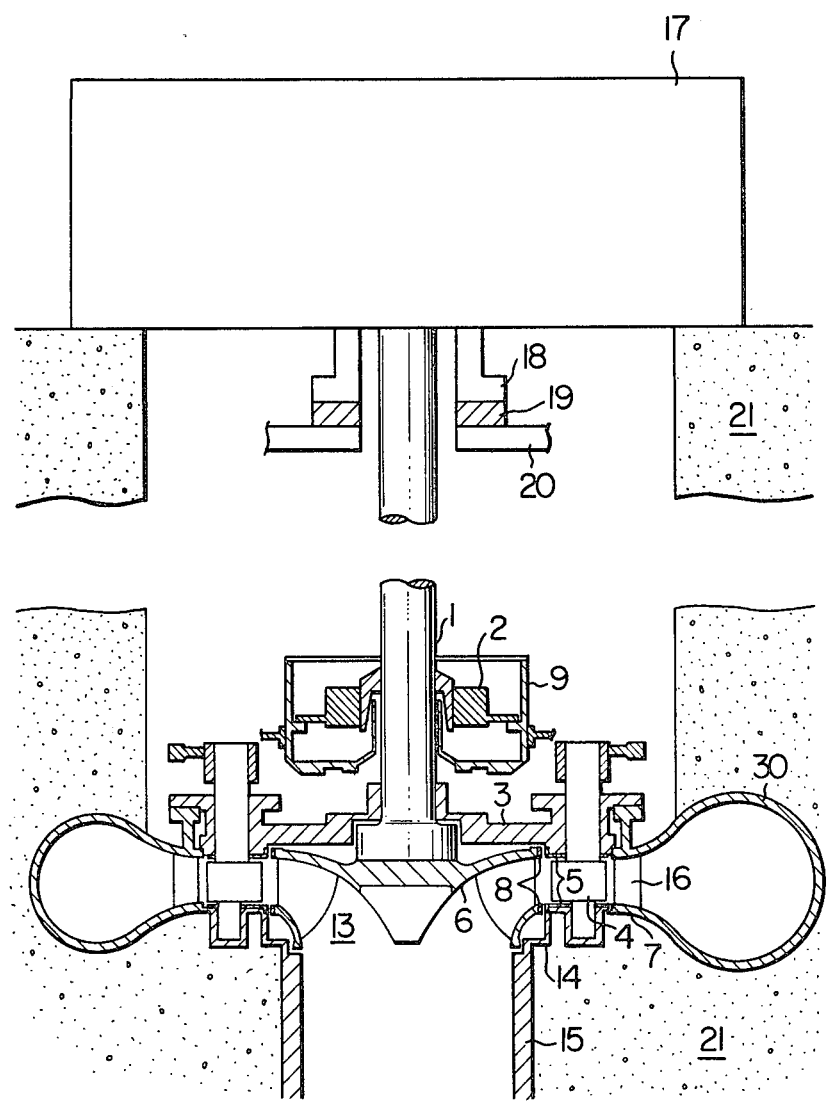
FIG. 1 is a vertical sectional view of a water turbine, which is a typical example of fluid machine, and a generator combined with the water turbine.

Before turning to the description of the invention, an explanation will be made as to the basic construction of the fluid machine, with specific reference to FIG. 1 which is a schematic vertical sectional view of a Francis turbine, a typical example of fluid machine.

The water turbine has a runner chamber 13 constituted by a head cover 3, bottom cover 14, draft tube 15 and so forth. A runner 6 is accommodated by this runner chamber 13 and mounted therein. In operation, water of large head rushes into a spiral casing 30 embedded in concrete 21, and is introduced into the runner chamber 13 through a passage which is constituted by a speed ring 7, stay vanes 16, guide vanes 4 and so on. The energy possessed by the water of large head is delivered to the runner 6, so as to rotate the latter. The water is then discharged out of the runner chamber through the draft tube 15. The rotation of the runner 6 is transmitted, through a main shaft 1 carried by a bearing 2 in a bearing box 9, to a generator 17, so that the latter is driven to produce electric energy. The total weight of the rotor (not shown) of the generator 17, runner 6, main shaft 1 and other associated parts is born, through a collar 18, by a thrust bearing 19 which in turn is carried by a support 20.

Runner liners 8 are attached to the periphery of the runner 6, while stationary liners 5 are attached to the wall of the runner chamber 13. These liners 8, 5 cooperate with each other in constituting a seal against the leak of high pressure water.

Figure 2:
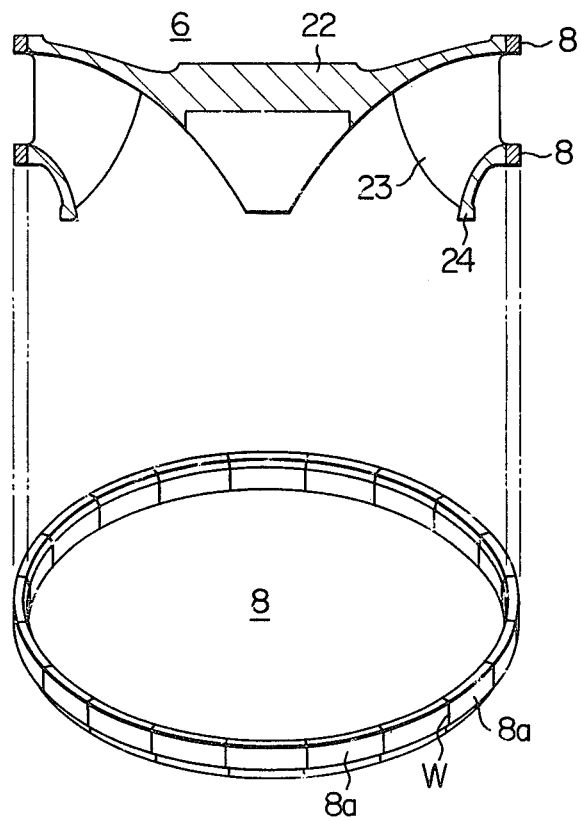
FIG. 2 shows in combination a vertical section of the runner and perspective appearance of a runner liner.
Figure 3:
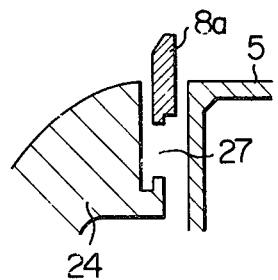
FIGS. 3 to 6 are illustrations of a preferred embodiment of the invention.
Figure 4:
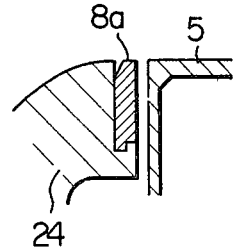
Figure 5:
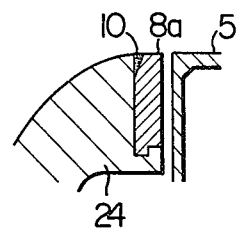
Figure 6:
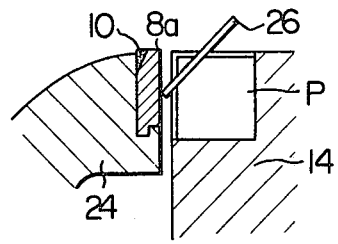

FIG. 2 shows at its upper half portion a detail of section of the runner 6 and a perspective appearance of the runner liner 8 at its lower half portion.

The runner 6 consists of a crown shroud 22, runner vanes 23 and a band shroud 24. Runner liners 8 are attached to the peripheries of the crown shroud 22 and band shroud 24, respectively. Each of the runner liners 8 is circumferentially divided, as shown in FIG. 2, into a plurality of segments 8a. Each segment 8a is so sized that it may be conveyed into the runner chamber, without necessitating the disassembling of the water turbine. Adjacent segments 8a are welded together at their junctures W, so that all segments are united together. The connection between the segments 8a and the runner 6 may be made by bolts or the like fastening means, although it can be most commonly accomplished by welding.

Figure 7:
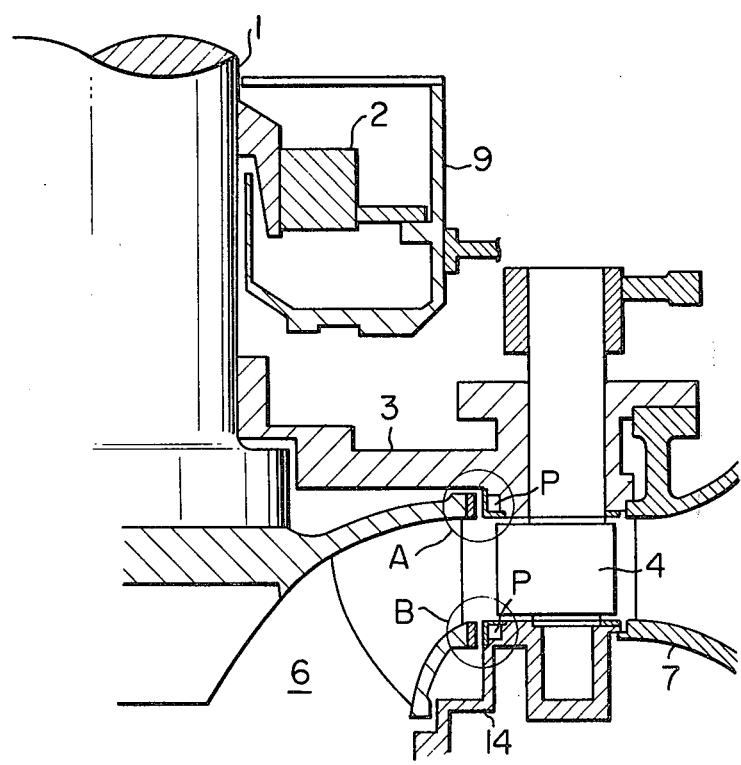
FIG. 7 shows in detail the peripheral portion of the runner to which the present invention is applied.

As will be seen from FIG. 7, pockets P are formed in the head cover 3 and the bottom cover 14, respectively, in order to facilitate the welding and other works which are made for attaching and detaching the runner liners.

Figure 8:
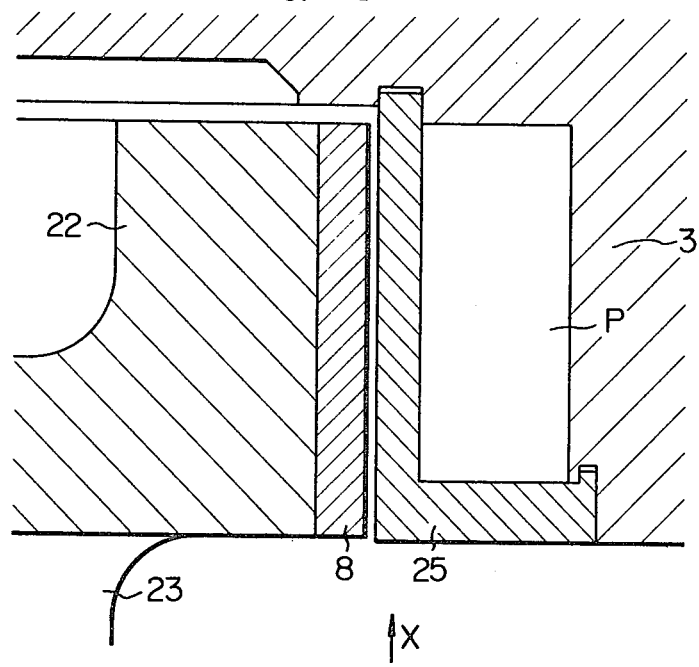
FIG. 8 shows in detail the portion of FIG. 7 encircled by a circle A.
Figure 9:
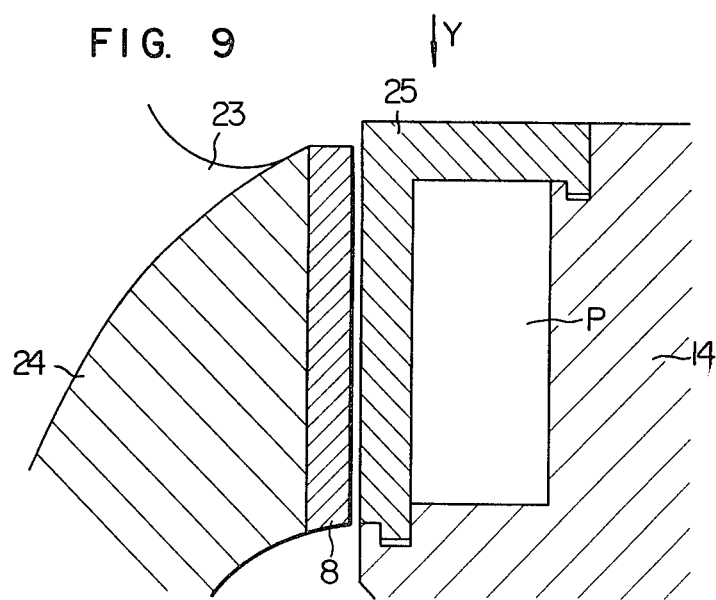
FIG. 9 shows in detail the portion of FIG. 7 encircled by a circle B.

The portion encircled by a circle A in FIG. 7 is shown in more detail in FIG. 8, while the portion encircled by a circle B is shown in a larger scale in FIG. 9. In FIGS. 8 and 9, reference numeral 25 denotes pocket covers. Other reference numerals denote the same parts and members as those in other Figures.

Figure 10:
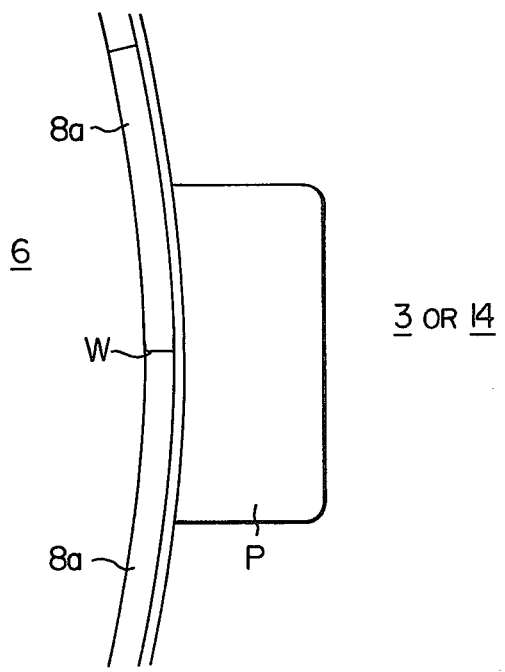
FIG. 10 is an end view of the portion as shown in FIG. 8 as viewed from the direction of arrow X or an end view of the portion as shown in FIG. 9 as viewed in the direction of arrow Y.

FIG. 10 is an enlarged plan view of a portion of the water turbine around the pocket P. More specifically, FIG. 10 is obtained by viewing the portion of the water turbine shown in FIG. 8 from the direction of arrow X, or viewing the portion of the water turbine shown in FIG. 9 from the direction of arrow Y, after the removal of the pocket cover 25.

Figure 11:
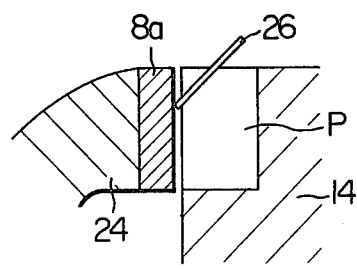
FIG. 11 is an illustration explanatory of a welding work for welding the runner liner.

As will be understood from FIG. 11, thanks to the provision of the pocket P, it becomes possible to insert the welding torch 26 deeper to cover the entire length of the juncture W, so that the welding work is facilitated considerably.

FIGS. 3 to 6 show preferred form of the runner liner 8 of the invention. Although this runner liner is shown in combination with the band shroud 24, needless to say, it can equally be used in combination with the crown shroud 22.

A groove 27 is formed in the band shroud 24, while the segments 8a of the runner liner 8 are machined to have a form well fitting the groove 27. Since each segment 8a is sized so as to be brought into the runner chamber via the draft tube 15 (See FIG. 1) or via the guide vane 4 (See FIG. 1), it is possible to attach the segment 8a to the band shroud 24 with the runner 6 set in the runner chamber 13, i.e. without necessitating the extraction of the runner 6 out of the runner chamber 13.

Usually, the segment 8a is so sized that it can pass the gap between adjacent stay vanes and the gap between adjacent guide vanes.

In assembling, after fitting the segment 8a into the groove 27, the segment 8a is welded to the band shroud 24 by means of a welding torch 26. Then, another segment 8a is placed adjacent to the first welded segment 8a, and is welded to both of the first welded segment 8a and the band shroud 24. The welding of the adjacent two segments at their juncture is made by rotating the runner so as to bring the juncture to face the pocket P.

In the described embodiment, as will be seen from FIG. 2, the runner liner 8 is circumferentially divided into 20 (twenty) segments. It is advisable to make the segment which is to be attached finally have a size larger than that of other segments. This final segment is suitably cut at the site to meet the clearance actually left for receiving the final segment, and then welded to the runner and adjacent segments.

For detaching the runner liner segments 8a from the band shroud 24, the deposited welding metal, designated at a reference numeral 10, is suitably removed by gouging or the like measure.

In the described embodiment, the segment 8a is so sized that it can pass through the gap between adjacent stay vanes and the gap between the adjacent guide vanes. This size of the segment 8a, however, is not exclusive and, needless to say, the segment 8a may be so sized that it may pass the gap between the adjacent runner vanes, as well as the space in the draft tube.

In the described embodiment, the segment 8a is fixed to the band shroud 24 not solely by welding but also by fitting to the groove of the band shroud. Consequently, the segment can be attached rigidly as compared with the case in which the fixing is made solely by welding. At the same time, the segment is correctly located and held on the band shroud 24. Further, the work for removing the segment is simplified as compared with the case in which the fixing is made solely by welding.

In case of the water turbine, both of the runner 6 and the runner liner 8 are made of a material having a good mechanical strength, as well as anti-erosion and wear-resistant properties, typically stainless steel. This material inconveniently has a poor weldability.

It is therefore recommended to form at the factory a layer of a material having good weldability at each welding area of the runner 6 and the segment 8a, when the runner and segments are produced.

The combination of the runner and the segments having such layers considerably facilitates the heat treatment, as well as the attaching of the segments to the runner in the runner chamber 13, so as to improve the reliability of the water turbine.

Further, the division of the runner liner into a plurality of segments offers an additional advantage of much facilitated transportation, over the conventional integral ring-shaped runner liner.

In the foregoing description, where the segments are so sized as to be passable through an access passage, such as the draft tube 15 or the inlet passage between the stay vanes or guide vanes, this structural relationship between the access passage and each individual segment to permit access without disassembly of at least the runner and runner chamber from their operative position is structurally referred to in the claims as an effective three-dimensional shape. Since the access passage does not necessarily have a uniform cross section and further may be curved along its length and since each segment may be universally freely moved to obtain its most desirable orientation for passing through various parts of the access passage, it is seen that the relationship is three-dimensional and involving the most effective three-dimensional positioning of the segment during passage through the access passage.

What is claimed is:

1. A runner liner in combination as a part of a fluid machine having a stationary runner chamber, a runner rotatably mounted in said runner chamber in an operative assembled relationship, a main shaft attached to said runner, a bearing for supporting said main shaft, a fluid passage through which a working fluid is introduced into said running chamber, another fluid passage through which said working fluid is discharged out of said runner chamber, at least one runner liner attached to the periphery of said runner, and a sealing means constituted by said runner liner in cooperation with a stationary sealing surface part of the wall of said runner chamber, wherein the improvement comprises:

said runner liner is circumferentially, with respect to the axis of said main shaft, divided into a plurality of arcuate segments serially welded to each other into an annular form arranged circumferentially of said runner;

means forming an access passage that extends from said sealing means to the exterior of the fluid machine when said runner chamber and runner are in the operative assembled relationship;

each of said segments having an effective three-dimensional shape smaller than the minimum effective three-dimensional shape of said access passage means;

said access passage means freely permitting movement of each segments therethrough so that each segment can be brought into said runner chamber from the exterior of said fluid machine while said runner is kept in said runner chamber in the operative assembled relationship without disassembly of said runner; and said runner chamber including workman chamber means immediately adjacent said runner liner for providing workman working access to said runner liner for assembly, disassembly and repair of said runner segments on said runner in said operative assembled relationship; a removable cover covering said workman chamber means and partially forming said stationary sealing surface part of the wall of said runner chamber.

2. The combination of claim 1, wherein said fluid machine is a water fluid machine designed to operate with water as the working fluid and further has a generator drivingly connected to said runner through said main shaft; and said operative assembled relationship includes said generator and main shaft drivingly connected to said runner.

3. The combination of claim 1, wherein said access passage is one of said fluid passage and said another fluid passage.

4. The combination of claim 2, wherein said access passage is one of said fluid passage and said another fluid passage.

5. The combination of claim 4, wherein said fluid machine includes an annular array of stay vanes in said access passage that are fixed in said operative assembled relationship.

6. The combination of claim 3, wherein said fluid machine includes an annular array of stay vanes in said access passage that are fixed in said operative assembled relationship.

7. The combination of claim 1, wherein said runner includes an annular groove in the periphery of said runner, and each of said segments having a portion retained in said groove.

8. The combination of claim 1, wherein each of said segments has opposite edge portions extending along respective serially adjacent segments, and said edge portions being of a metal substantially different from and of better weldability than the metal of the remainder of each segment.

* * * * *